United States Patent
Yang et al.

(10) Patent No.: US 10,233,285 B2
(45) Date of Patent: Mar. 19, 2019

(54) FLUORINATED SILANE COMPOUNDS, COMPOSITIONS, AND ARTICLES

(71) Applicant: 3M INNOVATIVE PROPERTIES COMPANY, St. Paul, MN (US)

(72) Inventors: Yu Yang, Eden Prairie, MN (US); Katherine A. Gibney, St. Paul, MN (US); Suresh S. Iyer, Woodbury, MN (US); Ingrid N. Haugan, St. Paul, MN (US); Chetan P. Jariwala, Woodbury, MN (US); Yifan Zhang, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 103 days.

(21) Appl. No.: 15/528,867

(22) PCT Filed: Nov. 24, 2015

(86) PCT No.: PCT/US2015/062329
§ 371 (c)(1),
(2) Date: May 23, 2017

(87) PCT Pub. No.: WO2016/094082
PCT Pub. Date: Jun. 16, 2016

(65) Prior Publication Data
US 2017/0313819 A1    Nov. 2, 2017

Related U.S. Application Data

(60) Provisional application No. 62/088,746, filed on Dec. 8, 2014.

(51) Int. Cl.
| | | |
|---|---|---|
| *C08G 65/336* | (2006.01) | |
| *C08G 65/00* | (2006.01) | |
| *C09D 171/02* | (2006.01) | |
| *C08G 65/333* | (2006.01) | |

(52) U.S. Cl.
CPC ......... *C08G 65/336* (2013.01); *C08G 65/007* (2013.01); *C08G 65/33306* (2013.01); *C09D 171/02* (2013.01)

(58) Field of Classification Search
CPC .................................................. C08G 65/336
See application file for complete search history.

(56) References Cited

U.S. PATENT DOCUMENTS

| | | |
|---|---|---|
| 3,890,269 A | 6/1975 | Martin |
| 3,950,588 A | 4/1976 | McDougal |
| 4,661,577 A | 4/1987 | Jo Lane |
| 5,026,890 A | 6/1991 | Webb |
| 5,214,119 A | 5/1993 | Leir |
| 5,276,122 A | 1/1994 | Aoki |
| 5,461,134 A | 10/1995 | Leir |
| 5,512,650 A | 4/1996 | Leir |
| 6,355,759 B1 | 3/2002 | Sherman |
| 7,335,786 B1 | 2/2008 | Iyer |
| 7,501,184 B2 | 3/2009 | Leir |
| 7,745,653 B2 | 6/2010 | Iyer |
| 8,268,067 B2 | 9/2012 | Iyer |
| 2007/0148474 A1 | 6/2007 | Leir |
| 2007/0148475 A1 | 6/2007 | Sherman |
| 2008/0318057 A1 | 12/2008 | Sherman |
| 2008/0318058 A1 | 12/2008 | Sherman |
| 2010/0167978 A1* | 7/2010 | Iyer ........................ C11D 3/162 510/433 |
| 2010/0221967 A1 | 9/2010 | Iyer |
| 2011/0008733 A1* | 1/2011 | Qiu ......................... G03F 1/48 430/272.1 |
| 2011/0230633 A1 | 9/2011 | Ferenz |
| 2011/0268899 A1 | 11/2011 | Albert |
| 2013/0342809 A1 | 12/2013 | Higuchi |

FOREIGN PATENT DOCUMENTS

| | | |
|---|---|---|
| WO | WO 1989/04329 | 5/1989 |
| WO | WO 2007/075317 | 7/2007 |
| WO | WO 2007/075802 | 7/2007 |
| WO | WO 2016/094199 | 6/2016 |

OTHER PUBLICATIONS

Howarter, "Self-Cleaning and Anti-Fog Surfaces via Stimuli-Responsive Polymer Brushes", Advanced Materials, 2007, vol. 19, No. 22, pp. 3838-3843.
International Search Report for PCT International Application No. PCT/US2015/062329, dated Feb. 15, 2016, 4 pages.

* cited by examiner

*Primary Examiner* — Michael F Pepitone
(74) *Attorney, Agent, or Firm* — Jean A. Lown

(57) ABSTRACT

Fluorinated silane compounds, compositions containing the fluorinated silane compounds, and articles prepared using the fluorinated silane compounds and compositions are described. The fluorinated silane compounds can be soluble or dispersible in aqueous media, such as water, and can be used to coat articles, such as glass articles.

15 Claims, No Drawings

FLUORINATED SILANE COMPOUNDS, COMPOSITIONS, AND ARTICLES

CROSS REFERENCE TO RELATED APPLICATIONS

This application is a national stage filing under 35 U.S.C. 371 of PCT/US2015/062329, filed Nov. 24, 2015, which claims the benefit of U.S. Provisional Application No. 62/088,746, filed Dec. 8, 2014, the disclosure of which is incorporated by reference in its/their entirety herein.

TECHNICAL FIELD

Compounds comprising fluorinated silanes are disclosed. Compositions and articles comprising such compounds are also disclosed.

BACKGROUND

Fluoropolymers can be hydrophobic. However, their use can be limited because they cannot be affixed to some substrates, and also can have minimal solubility and dispersibility in aqueous media.

Fluorinated silane compounds having one or more fluoropolymeric groups, such as those containing perfluoroalkyl groups, perfluoroether groups, and perfluoropolyether groups, as well as an appended silane group have been used to provide coating compositions to substrates such as glass and ceramic materials. Such fluorinated silanes include those, for example, described in U.S. Pat. No. 3,950,588 (McDougal), U.S. Pat. No. 7,335,786 (Iyer et al), U.S. Pat. No. 7,745,653 (Iyer et al), and U.S. Patent Application Publication No. 2010/0167978 (Iyer et al).

SUMMARY

Fluorinated silane compounds, compositions containing the fluorinated silane compounds, and articles prepared using the fluorinated silane compounds and compositions are described. The fluorinated silane compounds can be soluble or dispersible in aqueous media, such as water, and can be used to coat articles, such as glass articles. More particularly, the fluorinated silane compounds are fluorinated silanes of Formula (I)

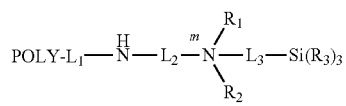

(I)

wherein:
POLY is a fluoropolymeric group;
$L_1$ is independently a covalent bond, carbonyl, alkylene carbonyl, alkenylene carbonyl, alkynylene carbonyl, alkylene, aralkylene, alkenylene, or alkynylene;
$L_2$ is alkylene, aralkylene, alkynylene, or arylene;
$L_3$ is alkylene, aralkylene, alkynylene, or arylene;
m is the charge on the N atom, which is 0 or $1^+$; and either:
$R_1$ is H, $CH_2CH(OH)R^a$—$Si(R_5)_3$ or $R^d$—$R^e$, and
$R_2$ is absent, H, $CH_2CH(OH)R^a$—$Si(R_5)_3$ or $R^d$—$R^e$, or
$R_1$ and $R_2$ are covalently bound to one another, and are together alkylene, aralkylene, alkenylene, alkynylene, arylene, or any of the preceding substituted with hydroxy;
each $R_3$ is independently hydroxy, alkoxy, or alkyl, provided that at least one $R_3$ is either hydroxy or alkoxy;
$R^a$ is alkylene or $R^b$—O—$R^c$;
$R^b$ is alkylene;
$R^c$ is alkylene;
$R^d$ is alkylene;
$R^e$ is $Si(R_5)_3$, $SO_3H$ or a salt thereof, or $CO_2H$ or a salt thereof; and
each $R_5$ is independently hydroxy, alkoxy, or alkyl, provided that at least one $R_5$ is alkoxy or hydroxy.

Compositions containing such compounds are also described.

Articles, particularly glass articles, having such compounds affixed thereto are also described.

DETAILED DESCRIPTION

Throughout this disclosure, singular forms such as "a," "an," and "the" are often used for convenience; however, it should be understood that the singular forms are meant to include the plural unless the singular alone is explicitly specified or is clearly indicated by the context.

Some terms used in this application have special meanings, as defined herein. All other terms will be known to the skilled artisan, and are to be afforded the meaning that a person of skill in the art at the time of the invention would have given them.

"Independently," when used in reference to the identify of one or more variable elements, means that each occurrence of any of the variable elements may have the same or different identity, within the specified limitations, regardless of the identity of any other occurrence of the reference element. Thus, if there are two occurrences of element "E," and each element E is independently A or B, the two occurrences of E can be either A or B, in any combination (e.g., AA, AB, BA, or BB).

"Alkyl" refers to an aliphatic hydrocarbon monovalent radical. Many alkyl radicals are from $C_1$ to $C_{30}$. Some alkyl radicals can be $C_1$ or greater, such as $C_2$ or greater, $C_4$ or greater, $C_6$ or greater, or $C_8$ or greater. Some alkyl radicals can be $C_{22}$ or smaller, $C_{16}$ or smaller, $C_{12}$ or smaller, $C_8$ or smaller, or $C_4$ or smaller. Unless otherwise indicated, any alkyl radical can independently be linear, branched, cyclic, or a combination thereof (e.g., a cyclic alkyl can also have a linear or branched component). Exemplary alkyl radicals include methyl, ethyl, propyl, isopropyl, n-butyl, t-butyl, sec-butyl, iso-butyl, 2-ethyl hexyl, iso-octyl, dodecyl, hexadecyl, behenyl, and the like.

"Aryl" refers to an aromatic radical. An aryl radical can include only carbon and hydrogen or may also include one or more heteroatoms. Aryl radicals can have aromatic rings with three or more atoms, four or more atoms, or five or more atoms. Aryl radicals can have rings with eight or fewer atoms, seven or fewer atoms, or six or fewer atoms. Exemplary aryl radicals include phenyl, furanyl, naphthyl, anthracenyl, and the like. Phenyl is a common aryl radical.

"Aralkyl" refers to a hydrocarbon monovalent radical that is an aryl substituted by an alkyl. Aralkyl radicals can have a total of two or more carbon atoms, three or more carbon atoms, four or more carbon atoms, five or more carbon atoms, or six or more carbon atoms. Aralkyl radicals can have a total of twenty-two or fewer carbon atoms, sixteen or fewer carbon atoms, twelve or fewer carbon atoms, ten or fewer carbon atoms, eight or fewer carbon atoms, seven or fewer carbon atoms, or six or fewer carbon atoms. Exemplary aralkyl radicals include xylyl, benzyl, and the like.

"Alkenyl" refers to an unsaturated hydrocarbon monovalent radical having one or more carbon-carbon double bonds. Many alkenyl radicals are from $C_2$ to $C_{30}$. Some alkenyl radicals can be $C_2$ or greater, such as $C_3$ or greater, $C_4$ or greater, $C_6$ or greater, $C_8$ or greater, or $C_{10}$ or greater. Some alkenyl radicals can be $C_{22}$ or smaller, $C_{16}$ or smaller, $C_{12}$ or smaller, $C_8$ or smaller, or $C_4$ or smaller. Unless otherwise indicated, any alkenyl can be monounsaturated or polyunsaturated alkenyl.

"Alkynyl" refers to an unsaturated hydrocarbon monovalent radical having one or more carbon-carbon triple bonds. Alkynyl radicals can also have one or more carbon-carbon double bonds. Many alkynyl radicals are from $C_2$ to $C_{30}$. Alkynyl groups can be, for example, $C_2$ or greater, $C_3$ or greater, $C_4$ or greater, $C_6$ or greater, $C_8$ or greater, or $C_{10}$ or greater. Alkynyl groups can be, for example, $C_{22}$ or fewer, $C_{16}$ or fewer, $C_{12}$ or fewer, $C_8$ or fewer, or $C_4$ or fewer.

"Alkylene" refers to an aliphatic hydrocarbon diradical (i.e., divalent radical). Many alkylene diradicals are from $C_1$ to $C_{30}$. Alkylene diradicals can be $C_1$ or greater, $C_2$ or greater, $C_3$ or greater, $C_4$ or greater, $C_6$ or greater, or $C_8$ or greater. Alkylene diaradicals can be $C_{22}$ or smaller, $C_{16}$ or smaller, $C_{12}$ or smaller, $C_{10}$ or smaller, or $C_8$ or smaller. Unless otherwise indicated, any alkylene can be linear, branched or cyclic or a combination thereof (e.g., having both a cyclic component and a linear component). Exemplary alkylenes include methylene, ethylene, propyl, isopropylene, n-butylene, t-butylene, sec-butylene, iso-butylene, 2-ethyl hexylene, iso-octylene, dodecylene, hexadecylene, behenylene, and the like.

"Alkenylene" refers to an unsaturated hydrocarbon diradical having one or more carbon-carbon double bonds. Many alkenylene diradicals are from $C_1$ to $C_{30}$. Alkenylene diradicals can be $C_2$ or greater, $C_3$ or greater, $C_4$ or greater, $C_6$ or greater, or $C_8$ or greater. Alkenylene diradicals can be $C_{22}$ or smaller, $C_{18}$ or smaller, $C_{16}$ or smaller, $C_{12}$ or smaller, $C_{10}$ or smaller, $C_8$ or smaller, or $C_6$ or smaller. Unless otherwise indicated, alkenylene diradicals can be monounsaturated or polyunsaturated, and can be linear, branched, cyclic, or a combination thereof (e.g., having both a cyclic component and a linear component).

"Alkynylene" refers to an unsaturated hydrocarbon diradical having one or more carbon-carbon triple bonds. Alkynylene diradicals can also have one or more carbon-carbon double bonds. Many alkynylene diradicals are from $C_2$ to $C_{30}$. Alkynylene diradicals can be $C_3$ or greater, $C_4$ or greater, $C_6$ or greater, or $C_8$ or greater. Alkynylene diradicals can be $C_{22}$ or smaller, $C_{18}$ or smaller, $C_{16}$ or smaller, $C_{12}$ or smaller, $C_{10}$ or smaller, $C_8$ or smaller, or $C_6$ or smaller. Unless otherwise indicated, alkynylene diradicals can be monounsaturated or polyunsaturated, and can be linear, branched, cyclic, or a combination thereof (e.g., having both a cyclic component and a linear component).

"Arylene" refers to an aromatic diradical. Arylene diradicals can have aromatic rings with three or more atoms, four or more atoms, or five or more atoms. Arylene diradicals can have rings with eight or fewer atoms, seven or fewer atoms, or six or fewer atoms. Suitable arylenes include phenylene, furanylene, piperidylene, naphthylene, and the like. Phenylene is a common arylene diradical.

"Aralkylene" refers to a diradical that is an alkylene substituted with an aryl, an arylene substituted with an alkyl, or an alkylene bonded to an arylene. Aralkylene diradicals can have a total of two or more carbon atoms, three or more carbon atoms, four or more carbon atoms, five or more carbon atoms, or six or more carbon atoms. Aralkylene diradicals can have a total of twenty-two or fewer carbon atoms, sixteen or fewer carbon atoms, twelve or fewer carbon atoms, ten or fewer carbon atoms, eight or fewer carbon atoms, seven or fewer carbon atoms, or six or fewer carbon atoms. Aralkylene groups include xylylene, toluenylene, and the like.

"Alkoxy" refers to a radical having the formula —O-ALK, wherein ALK is alkyl. The alkyl can include any alkyl, for example, any alkyl group referenced in the definition of "alkyl," herein. The alkyl portion of an alkoxy substituent can independently be linear, branched, cyclic, or a combination thereof (e.g., a cyclic alkyl can also have a linear or branched component). Examples of alkoxys include methoxy, ethoxy, propoxy, isopropoxy. n-butoxy, t-butoxy, sec-butoxy, iso-butoxy, 2-ethyl hexoxy, iso-octoxy, dodecoxy, hexadecoxy, and the like. Particular examples include methoxy and ethoxy.

"Hydroxy" refers to a radical having the formula —OH.

"Carbonyl alkoxy" refers to a radical having the formula —C(O)-G, wherein G is alkoxy. The alkoxy can be any alkoxy, such as those referred to under the definition of "alkoxy," herein.

"Carbonyl alkyl" refers to a radical having the formula —C(O)-ALK, wherein ALK is alkyl. The alkyl group can be any alkyl group, such as those referred to under the definition of "alkyl," herein.

"Carbonyl hydroxy" refers to a radical having the formula —C(O)OH.

"Carbonyl halide" refers to a radical having the formula —C(O)X, wherein X is chlorine, bromine, or iodine.

"Alkylene carbonyl" refers to a diradical (i.e., divalent radical) having the formula -ALK-C(O)—, wherein ALK is alkylene. The alkylene can be any alkylene, such as those referred to in the definition of "alkylene," herein.

"Alkylene carbonyl halide" refers to a radical having the formula -ALK-C(O)X, wherein ALK is alkylene and X is chlorine, bromine, or iodine. The alkylene can be any alkylene, such as those referred to in the definition of "alkylene" herein.

"Alkenylene carbonyl" refers to a diradical having the formula -G-C(O)—, wherein G is alkenylene. The alkenylene can be any alkenylene, such as those referred to in the definition of "alkenylene," herein.

"Alkynylene carbonyl" refers to a diradical having the formula -G-C(O)—, wherein G is alkynylene. The alkynylene can be any alkynylene, such as those referred to in the definition of "alkynylene," herein.

"Sulfonyl hydroxy" refers to a radical having with the formula —$SO_3H$. "Fluoro" is used as a prefix to a type of radical, diradical, or molecule, to refer to a version of the radical, diradical, or chemical compound having at least one carbon-bound fluorine atom.

"Perfluoro" or "perfluorinated" are used as modifiers to refer to a version of the subject radical, diradical, or chemical compound wherein substantially all of the carbon-bound hydrogen atoms are substituted with carbon-bound fluorine atoms. In this context, "substantially all" means that no more than trace amounts of carbon-bound hydrogen atoms are present, except that in the case of a perfluoropolymer or a perfluorinated polymer, one or more terminal or end-groups can optionally have one or more carbon-bond hydrogen atoms.

"Fluoropolymer" refers to a polymer having one or more carbon-bound fluorine atoms. Fluoropolymers can be partially fluorinated, wherein the polymer contains one or more carbon-bound hydrogen atoms, or perfluorinated, wherein essentially all carbon-bound hydrogen atoms are replaced by carbon-bound fluorine atoms. In this context, "essentially all" means that no more than trace amounts of polymerized monomers containing carbon-bound hydrogen atoms are present in the polymer, except that one or more terminal or end-groups of the fluoropolymer can optionally have one or more carbon-bond hydrogen atoms. When not specified, the end groups of a fluoropolymer can vary; typical end groups include fluoromethyl, such as perfluoromethyl, hydroxy, as well as terminating groups, quenching groups, and chain transfer groups.

"HFPO" refers to "hexafluoropropylene oxide," and can refer to a polymer or a polymeric group with the repeat unit —$OCF_2CF(CF_3)$—. Multiple repeat units may be present in a head-to-head, head-to-tail, or tail-to-tail configuration, or in any combination thereof. When not specified, the end groups of HFPO can vary; typical end groups include fluoromethyl, such as perfluoromethyl, hydroxy, as well as terminating groups, quenching groups, and chain transfer groups.

"HFPPG" refers to "hexafluoropropylene glycol," and can refer to a polymer or a polymeric group with the repeat unit —$O(CF_2)_3$—. When not specified, the end groups of HFPPG can vary; typical end groups include fluoromethyl, such as perfluoromethyl, hydroxy, as well as terminating groups, quenching groups, and chain transfer groups.

"PTFE" refers to "polytetrafluoroetylene," and can refer to a polymer or polymeric group having the repeat unit —$(CF_2)_2$—.

A fluorinated silane can have the structure of Formula (I).

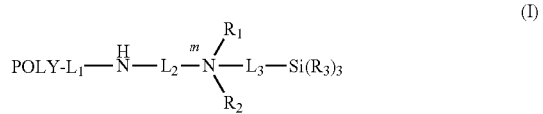

In Formula (I):
POLY is a fluoropolymeric group;
$L_1$ a covalent bond, carbonyl, alkylene carbonyl, alkenylene carbonyl, alkynylene carbonyl, alkylene, aralkylene, alkenylene, or alkynylene;
$L_2$ is a covalent bond, alkylene, aralkylene, alkenylene, alkynylene, or arylene;
$L_3$ is alkylene, aralkylene, alkenylene, alkynylene, or arylene;
m represents the charge on the N atom, which is 0 or $1^+$; and either:
$R_1$ is independently H, $CH_2CH(OH)R^a$—$Si(R_5)_3$, or $R^d$—$R^e$, and
$R_2$ is absent, H, $CH_2CH(OH)R^a$—$Si(R_5)_3$ or $R^d$—$R^e$; or
$R_1$ and $R_2$ are covalently bound to one another and are together alkyl, aralkyl, alkynyl, aryl, substituted aryl, or any of the preceding substituted with hydroxy;
each $R_3$ is independently hydroxy, alkoxy, or alkyl, provided that at least one $R_3$ is either hydroxy or alkoxy;
$R^a$ is alkylene or $R^b$—O—$R^c$;
$R^b$ is alkylene;
$R^c$ is alkylene;
$R^d$ is alkylene;
$R^e$ is $Si(R_5)_3$, $SO_3H$ or a salt thereof, or $CO_2H$ or a salt thereof; and each $R_5$ is independently alkyl, alkoxy, or hydroxy, with the proviso that at least one $R_5$ is alkoxy or hydroxy.

In many cases, compounds of Formula (I) feature an $L_1$ that is carbonyl. Such compounds are compounds of Formula (Ia).

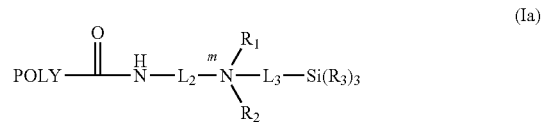

Compounds of Formula (I) and (Ia) can be useful in that they have silyl groups $Si(R_3)_3$, which allow them to be affixed to glass, for example, as a coating on glass. Such coatings can impart one or more of hydrophobicity, water repellency, and ink repellency to the glass.

In compounds of Formula (I) or (Ia), POLY can be any suitable monovalent radical of a fluoropolymer. Such fluoropolymers can include fluorinated polyolefins, fluorinated polyethers, and fluorinated polyalkylenes. Perfluorinated fluoropolymers are often used because such polymers can be more hydrophobic than other fluoropolymers. Greater hydrophobicity can be beneficial for some applications, such as water repellency. Exemplary perfluoropolymers include perfluorinated polyethers and perfluorinated polyalkenylenes. Perfluorinated polyethers, such as HFPO and HFPG, are most common.

When POLY is a monovalent radical of a fluorinated polyalkylene, it is most often a perfluorinated polyalkylene. The fluorinated or perfluorinated polylkylene can be any fluorinated or perfluorinated polyalkylene. The fluorinated or perfluorinated polyalkylene can be linear or branched, and can have a repeat unit with at least 1 carbon atom, at least 2 carbon atoms, at least 3 carbon atoms, or at least 4 carbon atoms. The repeat unit can also have no more than 8 carbon atoms, no more than 7 carbon atoms, no more than 6 carbon atoms, no more than 5 carbon atoms, no more than 4 carbon atoms, or no more than 3 carbon atoms. Exemplary perfluorinated polyalkylenes include PTFE and poly(hexafluoropropylene).

When POLY is a monovalent radical of a fluorinated or perfluorinated polyether, the fluorinated or perfluorinated polyether can be any fluorinated or perfluorinated polyether. Fluorinated or perfluoropolyethers typically contain one or more repeat units of the general formula —$R_fO$—, wherein each $R_f$ is independently fluoralkylene or perfluoroalkylene. Each $R_f$ can independently have at least 1 carbon atom and often have at least 2 carbon atoms, at least 3 carbon atoms, or at least 4 carbon atoms. Each $R_f$ can independently have up to 50 carbon atoms, up to 40 carbon atoms, up to 30 carbon atoms, up to 25 carbon atoms, up to 20 carbon atoms, up to 16 carbon atoms, up to 12 carbon atoms, up to 10 carbon atoms, up to 8 carbon atoms, up to 4 carbon atoms, or up to 3 carbon atoms. Typical examples of $R_f$ have 1 to 10 carbon atoms, 1 to 8 carbon atoms, 1 to 6 carbon atoms, 1 to 4 carbon atoms, or 1 to 3 carbon atoms. The number of carbon atoms in each occurrence of $R_f$ can be the same or different. In many cases, the number of carbon atoms in each occurrence of $R_f$ is the same. In most of such cases, POLY is a homopolymer. Exemplary homopolymers include homopolymers wherein each occurrence of $R_f$ has two carbon atoms, in which case POLY is poly(tetrafluoroethylene oxide). Other exemplary homopolymers include homopolymers wherein each $R_f$ has three carbon atoms. When such three-carbon $R_f$ is linear, POLY is HFPG. When such three-carbon $R_f$ is branched, POLY is HFPO.

For many applications, POLY can be large enough to impart hydrophobic character to the compound of Formula (I) or (Ia). Because the hydrophobic character of such compounds often depends on number of repeating units in POLY, it can be convenient to refer to POLY in terms of its average degree of polymerization, such as the number average degree of polymerization. In many cases, sufficient hydrophobic character can be obtained by using POLY with a number average degree of polymerization of 6 or greater, such as 7 or greater, 8 or greater, 9 or greater, 10 or greater, 15 or greater, 20 or greater, 25 or greater, or 30 or greater. The number average degree of polymerization can, in some cases, be limited only by the maximum available chain length of the particular POLY. In other cases, the number average degree of polymerization can be 20,000 or less, 15,000 or less, 10,000 or less, 5,000 or less, 4,000 or less, 3,000 or less, 2,000 or less, 1,000 or less, 500 or less, 250 or less, 100 or less, 75 or less, 50 or less, 25 or less, or 20 or less.

The compound of Formula (I) or (Ia) can be made starting with a polymer having the structure of Formula (II). In the compound of Formula (II), EG is a functional endgroup capable of reacting with a primary amine.

POLY-EG  (II)

The functional end group EG can include a halide (e.g., such as chlorine, bromine, or iodine), alkyl halide (e.g., alkyl chloride, alkyl bromide, or alkyl iodide), alkenyl halide (e.g., alkenyl chloride, alkenyl bromide, or alkenyl iodide), or alkynyl halide (e.g., alkynyl chloride, alkynyl bromide, or alkynyl iodide).

Alternatively, EG in Formula (II) can be carbonyl alkoxy, carbonyl hydroxy, carbonyl halide, alkylene carbonyl halide, alkenylene carbonyl halide, alkynylene carbonyl halide, alkylene carbonyl alkoxy, alkenylene carbonyl alkoxy, or alkynylene carbonyl alkoxy.

A compound of Formula (II) can react with a compound of Formula (III) to form intermediate compound (IV), as shown in Reaction Scheme 1.

Reaction Scheme 1

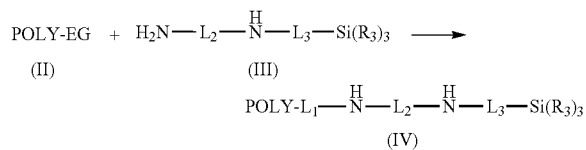

The reaction conditions for the reaction of Reaction Scheme 1 can depend on the nature of EG. When EG is halide, alkyl halide, alkenyl halide, or alkynyl halide, the reaction can take place under conditions suitable for a nucleophilic substitution reaction. Many appropriate reaction conditions are known in the art. Typically, a compound of Formula (II) is added to a compound of Formula (III) with mechanical stirring. The reaction often takes place at ambient temperature; if heat is produced during the reaction, then the reaction can be cooled, for example, by use of an ice bath. In some cases, the reaction may not proceed at ambient temperature, in which case the reaction can be heated to a temperature sufficient to facilitate the reaction. An inert diluent that does not undergo chemical reaction under the reaction conditions can be used. Inert diluents include aromatic compounds such as benzene and toluene, as well as ethers such as tetrahydrofuran and diethyl ether, and halogenated compounds such as dichloromethane.

When EG is carbonyl alkoxy, carbonyl hydroxy, carbonyl halide, alkylene carbonyl halide, alkenylene carbonyl halide, alkynylene carbonyl halide, alkylene carbonyl alkoxy, alkenylene carbonyl alkoxy, or alkynylene carbonyl alkoxy, the reaction can take place under conditions suitable for an amidation reaction. Many appropriate reaction conditions are known in the art. In many cases, contacting the compounds of Formula (II) and Formula (III) with stirring at ambient temperature is sufficient. The compound of Formula (III) can be added in stoichiometric excess in order to facilitate high yields. In such cases, excess compound of Formula (III) can be present in the product, and removal of such excess compound can be desirable in some circumstances.

In some cases, a catalyst can be added to facilitate the reaction. The catalyst can be an acid or base, such as an Arrhenius acid or base. Most commonly, when a catalyst is used, it is an Arrhenius acid, typically a mineral acid. Suitable mineral acids include hydrochloric acid, hydrobromic acid, phosphoric acid, nitric acid, nitrous acid, and sulfuric acid. Alternatively, a strong base such as sodium methoxide, sodium borohydride, methyllithium, or butyllithium can be used to facilitate the reaction. The strong base can deprotonate the primary amine in Formula (III), thereby increasing the reactivity of the compound of Formula (II) with the compound of Formula (III).

The reaction can be conducted with the compounds of Formulas (II) and (III) dissolved or dispersed in an inert diluent. The inert diluent is typically one that does not react under amidation conditions. Exemplary inert diluents for this reaction include ethers, ketones, and aromatics. Exemplary ethers include diethyl ether. Exemplary ketones include acetone and methyl ethyl ketone. Exemplary aromatics include toluene, xylenes, and benzene. No inert diluent is required because the reaction can be conducted neat. Neat reactions are particularly convenient because it is not necessary to remove solvent in order to obtain pure product. However, byproducts can be produced during the reaction. Removal of such byproducts can be desirable in some circumstances. When removal of such byproducts is desirable, it can be accomplished by any suitable method. Suitable methods, which include column chromatography and distillation, can be selected depending on the nature of the byproduct. In many cases, EG is carbonyl alkoxy. The alkyl in the alkoxy group is often $C_1$ to $C_4$ alkyl, such as methyl or ethyl.

In many cases, the reaction of Reaction Scheme 1 can be accomplished without the use of solvent and at ambient temperature. In such cases, the compounds of Formulas (II) and (III) can be mixed and allowed to stir at ambient temperature for one to three days. This is particularly true when EG in the compound of Formula (II) is alkylene carbonyl alkoxy or alkylene carbonyl halide, such as alkylene carbonyl chloride or alkylene carbonyl bromide.

The chemical identity of $L_1$ in the compound of Formula (IV) will depend on the nature of EG in Formula (II). When EG in the compound of Formula (II) is halide, then $L_1$ in the compound of Formula (IV) is a covalent bond to POLY. When EG in the compound of Formula (II) is alkyl halide, aralkyl halide, alkenyl halide, or alkynyl halide, then $L_1$ in the compound of Formula (IV) is the corresponding alkylene, alkenylene, or alkynylene.

When EG in the compound of Formula (II) is carbonyl alkoxy, carbonyl hydroxy, or carbonyl halide, then $L_1$ in the compound of Formula (IV) is carbonyl.

When EG in the compound of Formula (II) is alkylene carbonyl halide or alkylene carbonyl alkoxy, then $L_1$ in the compound of Formula (IV) is the corresponding alkylene carbonyl.

When EG in the compound of Formula (II) is alkenylene carbonyl halide or alkenylene carbonyl alkoxy, then $L_1$ in the compound of Formula (IV) is alkenylene carbonyl.

When EG in the compound of Formula (II) is alkynylene carbonyl halide or alkynlene carbonyl alkoxy, then $L_1$ in the compound of Formula (IV) is alkynylene carbonyl.

Because EG is usually carbonyl alkoxy, $L_1$ is most often carbonyl. In such cases, the compound of Formula (I) is a compound of Formula (Ia).

In Formula (III) $L_2$ can be any suitable linking group, such as a covalent bond, alkylene, aralkylene, alkenylene, alkynylene, or arylene, any of which can optionally be substituted. When $L_2$ is alkylene, the alkylene can be any suitable alkylene, such as $C_1$ to $C_{22}$ alkylene, $C_1$ to $C_{16}$ alkylene, $C_1$ to $C_{12}$ alkylene, $C_1$ to $C_8$ alkylene, or $C_1$ to $C_4$ alkylene. When $L_2$ is aralkylene, the alkylene or alkyl portion of the aralkylene can be any suitable alkylene or alkyl, such as $C_1$ to $C_{22}$ alkylene or alkyl, $C_1$ to $C_{16}$ alkylene or alkyl, $C_1$ to $C_{12}$ alkylene or alkyl, $C_1$ to $C_8$ alkylene or alkyl, or $C_1$ to $C_4$ alkylene or alkyl. The arylene or aryl portion can be any suitable arylene or aryl as defined above. When $L_2$ is alkenylene, the alkenylene can be any suitable alkyenylene, for example $C_2$ to $C_{16}$ alkenylene, $C_2$ to $C_{12}$ alkenylene, $C_2$ to $C_8$ alkenylene, or $C_2$ to $C_4$ alkenylene. When $L_2$ is alkynylene, it can be any suitable alkynylene, such as $C_2$ to $C_{16}$ alkynylene, $C_2$ to $C_{12}$ alkynylene, $C_2$ to $C_8$ alkynylene, or $C_2$ to $C_4$ alkynylene. When $L_2$ is arylene, it can be any suitable arylene, such as phenylene, napthylene, anthrylene, pyridylene, furanylene, pyrrolylene, or thionylene.

In some cases, $L_2$ is alkylene, aralkylene, or arylene. In many cases, $L_2$ is alkylene, such as $C_1$ to $C_8$ or $C_1$ to $C_6$ alkylene. In such cases, $L_2$ is often ethylene.

In the compound of Formula (III), $L_3$ can be any suitable linking group, such as alkylene, aralkylene, alkenylene, alkynylene, or arylene. When $L_3$ is alkylene, the alkylene can be any suitable alkylene, such as $C_1$ to $C_{16}$ alkylene, $C_1$ to $C_{12}$ alkylene, $C_1$ to $C_8$ alkylene, or $C_1$ to $C_4$ alkylene. When $L_3$ is aralkylene or arylene, the aralkylene or arylene can be the same as described above for $L_2$. When $L_3$ is alkenylene, the alkenylene can be any suitable alkyenylene, for example $C_2$ to $C_{16}$ alkenylene, $C_2$ to $C_{12}$ alkenylene, $C_2$ to $C_8$ alkenylene, or $C_2$ to $C_4$ alkenylene. When $L_3$ is alkynylene, the alkynylene can be any suitable alkynylene, such as $C_2$ to $C_{16}$ alkynylene, $C_2$ to $C_{12}$ alkynylene, $C_2$ to $C_8$ alkynylene, or $C_2$ to $C_4$ alkynylene.

In some cases, $L_3$ is alkylene, aralkylene, or arylene. In most cases, $L_3$ is alkylene, such as $C_1$ to $C_{22}$, $C_1$ to $C_{16}$, $C_1$ to $C_{12}$, $C_1$ to $C_8$, or $C_1$ to $C_4$ alkylene. Particular examples are propylene and butylenes. Propylene, especially n-propylene, is often used.

Each $R_3$ independently can be alkyl, hydroxy or alkoxy. At least one instance of $R_3$ is either hydroxy or alkoxy, because at least one hydroxy or alkoxy group is needed to allow the compound to bond with glass. When an $R_3$ is alkyl, it can be any suitable alkyl such as $C_1$ to $C_{16}$ alkyl, $C_1$ to $C_{12}$ alkyl, $C_1$ to $C_8$ alkyl, or $C_1$ to $C_4$ alkyl. When an $R_3$ is alkoxy, it can be any suitable alkoxy such as $C_1$ to $C_{16}$ alkoxy, $C_1$ to $C_{12}$ alkoxy, $C_1$ to $C_8$ alkoxy, or $C_1$ to $C_4$ alkoxy. Ethoxy and methoxy are common.

In many cases in the compound of Formula (III), $L_3$ is an alkylene and $R_3$ is alkoxy. In such cases, the compound of Formula (III) is N-[(trialkoxysilyl)alkyl]alkylenediamine. An exemplary N-[(trialkoxysilyl)alkyl]alkylenediamine is N-[3-trimethoxysilyl)propyl]ethylenediamine.

In the compound of Formula (IV), POLY, $L_2$ and $L_3$ come from the compound of Formulas (III), and are defined in the same manner as in that compound. $L_1$ is derived from the reaction of EG with the primary amine of the compound of Formula (III); the chemical identity of $L_1$ depends on the chemical identity of EG as described above.

The compound of Formula (IV), which is the product of Reaction Scheme 1, is a compound of Formula (I) wherein $R_1$ is H, $R_2$ is absent, and m is 0. When $L_1$ is carbonyl, then the compound of Formula (IV) is the compound of Formula (IVa). The compound of Formula (IVa) is a compound of Formula (Ia) wherein $R_1$ is H, $R_2$ is absent, and m is 0.

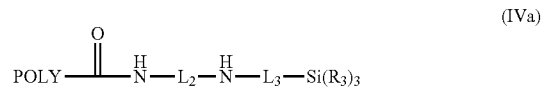

(IVa)

In some embodiments of the compound of Formula (IVa), $L_2$ and $L_3$ are both alkylene and at least one of the $R_3$ groups is alkoxy. In some more specific embodiments, both $L_2$ and $L_3$ are alkylene groups having 1 to 10 carbon atoms and at least one $R_3$ is an alkoxy having 1 to 4 carbon atoms. In some even more specific embodiments, each $R_3$ is an alkoxy having 1 to 4 carbon atoms.

If desired, the secondary amine in the compound of Formula (IV) or (IVa) can react with any suitable molecule, particularly molecules bearing one or more leaving groups, in order to form a tertiary amine or quaternary ammonium having, for example, one or more of an $R_1$ that is not H and an $R_2$ that is not absent.

$R_1$ and, when it is not absent, $R_2$, can be covalently bound to the amine nitrogen by any suitable reaction. For example, a compound having an electrophilic group or a good leaving group can react with the amine by way of a nucleophilic substitution reaction. Many such reactions are known in the art.

When $R_2$ is not absent, then $R_1$ and $R_2$ can either be separate groups or they can be covalently bound to one another such that $R_1$ and $R_2$ together with the nitrogen atom to which they are attached combine to form a ring structure. In the latter case, $R_1$ and $R_2$ together can be alkylene, aralkylene, alkenylene, alkynylene, arylene, or any of the preceding substituted with hydroxy. In such situations, the charge, m, on the amine nitrogen is $1^+$. This charge can improve the water solubility or dispersibility of the compounds. Water solubility or dispersibility can be beneficial in that it can allow the compound to be present as a solution or dispersion in aqueous media.

When $R_1$ and $R_2$ together are alkylene or alkylene substituted with hydroxy, the alkylene can be any suitable alkylene, such as $C_2$ to $C_{16}$ alkylene, $C_2$ to $C_{12}$ alkylene, $C_2$ to $C_8$ alkylene, or $C_2$ to $C_4$ alkylene. $C_3$ alkylene is common, in which case $R_1$ and $R_2$ together with the nitrogen atom to which they are bound form a four membered ring. When a hydroxyl substituent is present, the hydroxy substituent can be covalently bonded to any carbon atom the ring. When the ring is a four membered ring, $R_1$ and $R_2$ together form propylene and the hydroxy is typically bonded to the 2-carbon, i.e., the carbon atom that is not covalently bonded to the nitrogen atom.

When $R_1$ and $R_2$ together can form aralkylene or aralkylene substituted with hydroxy. Suitable aralkylenes are the same as those described above for L. The hydroxy substituent, if present, can be at any location on the aralkylene, but is typically on the alkylene or alkyl portion of the aralkylene.

When $R_1$ and $R_2$ together form alkenylene or alkenylene substituted with hydroxyl, the alkenylene can be any suitable alkyenylene, for example $C_2$ to $C_{16}$ alkenylene, $C_2$ to $C_{12}$ alkenylene, $C_2$ to $C_8$ alkenylene, or $C_2$ to $C_4$ alkenylene. When the hydroxy substituent is present it can be located at any suitable portion of the alkenylene, such as at a vinyl carbon, an allyl carbon, or another carbon.

When $R_1$ and $R_2$ together form an alkynylene or alkynylene substituted with hydroxy, it can be any suitable alkynylene, such as $C_2$ to $C_{16}$ alkynylene, $C_2$ to $C_{12}$ alkynylene, $C_2$ to $C_8$ alkynylene, or $C_2$ to $C_4$ alkynylene. When a hydroxy substituent is present, it can be located at any suitable carbon in the alkynylene, such as alpha to one of more alkynes, beta to one or more alkynes, or at any other carbon.

When $R_1$ and $R_2$ together form an arylene or arylene substituted with hydroxy, it can be any suitable arylene, such as the arylenes discussed above with respect to arylenes. When a hydroxy is present, it can be located at any suitable location on the arylene.

Compounds of Formula (IV) can be converted to compounds of Formula (I) wherein $R_1$ and $R_2$ are covalently bound together by any suitable chemical reaction. Typical chemical reactions involve reaction of the secondary amine in Formula (VI) with a molecule having two electrophilic leaving groups. Examples of suitable leaving groups, which may be the same or different, include chloride, bromide, iodide, methylsulfonate, trifluoromethansulfonate, tosylate, and mesylate. Other functional groups that can react with the secondary amine to form structures where $R_1$ and $R_2$ are covalently bound to one another include glycidyl groups.

When $R_1$ and $R_2$ are covalently bound together to form a substituted alkylene, hydroxy is a common substituent. Hydroxy substituents can occur when $R_1$ and $R_2$ together are a formed by reaction of a compound of Formula (I) with an epoxide bearing a leaving group of Formula (V) to form a compound of Formula (VI) as illustrated in Reaction Scheme 2.

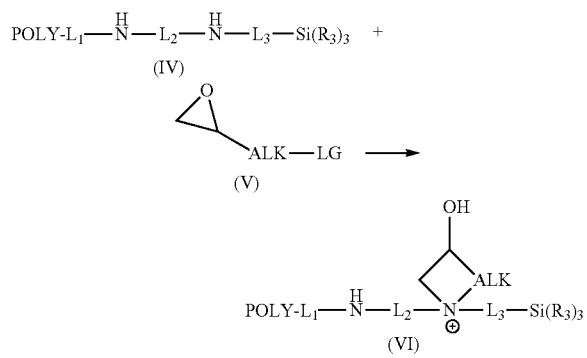

In the compound of Formula (V), ALK is alkylene, such as $C_1$ to $C_{22}$ alkylene, $C_1$ to $C_{18}$ alkylene, $C_1$ to $C_8$ alkylene, or $C_1$ to $C_4$ alkylene. When the compound of Formula (V) is epichlorohydrine, ALK is methylene. Other examples of ALK include ethylene, propylene, and butylene.

In the compound of Formula (VI), ALK has the same definition as in the compound of Formula (V). Compounds of Formula (VI) can be water soluble or dispersible, and are often water soluble.

In the compound of Formula (V), LG is a leaving group. Any suitable leaving group can be used. Exemplary leaving groups include chloride, bromide, iodide, methylsulfonate, trifluoromethansulfonate, tosylate, and mesylate. When the compound of Formula (V) is epichlorohydrin, LG is chloride.

In the compound of Formula (VI), which is the product of Reaction Scheme 2, $L_1$, $L_2$, $L_3$, and $R_3$ are defined as discussed herein with reference to the compounds of Formula (I) and (III). The charge on the amine nitrogen, m, is $1^+$.

$L_1$ in the compound of Formula (VI) can carbonyl. In such cases, the compound of Formula (VI) is a compound of Formula (VIa).

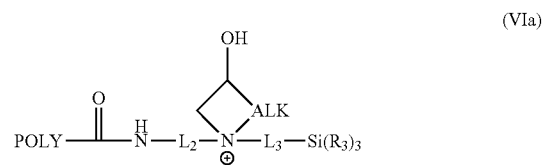

ALK in the compound of Formula (VIa) can be methylene, particularly when the compound of Formula (V) is epichlorohydrin. In such cases, the compound of Formula (VIa) is a compound of Formula (VIb).

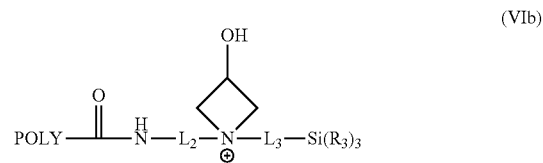

Returning to the compounds of Formulas (I) and (Ia), when $R_1$ and $R_2$ are not covalently bound to one another, $R_1$ can be H, $CH_2CH(OH)R^a$—$Si(R_5)_3$ or $R^d$—$R^e$, and $R_2$ can be absent, H, $CH_2CH(OH)R^a$—$Si(R_5)_3$, or $R^d$—$R^e$. When $R_1$ is H and $R_2$ is absent, the amine is a secondary amine having a charge, m, of 0. When $R_1$ is not H and $R_2$ is neither absent nor H, then the amine is a tertiary amine having a charge, m, of $1^+$. Similarly if both $R_1$ and $R_2$ are present such that one is H and one is not H, the amine is a protonated tertiary amine and bears a charge, m, of $1^+$. As discussed above, this charge can be beneficial because it increases the water solubility or dispersibility of the compound of Formula (I) or (Ia).

When $R_1$ is $CH_2CH(OH)R^a$—$Si(R_5)_3$, $R^a$ is alkylene or $R^b OR^c$. A compound of Formula (I) or Formula (Ia) bearing this type of $R_1$ can be formed by reaction of the secondary amine of Formula (IV) with a compound of Formula (VII).

When $R^a$ is alkylene, it can be $C_1$ or greater, $C_2$ or greater, $C_3$ or greater, $C_4$ or greater, $C_6$ or greater, $C_8$ or greater, or $C_{10}$ or greater. $R^a$ can also be $C_{22}$ or smaller, $C_{16}$ or smaller, $C_{12}$ or smaller, $C_8$ or smaller, or $C_4$ or smaller. More commonly, $R^a$ is $R^b$—O—$R^c$. In such cases, each of $R^b$ and $R^c$ can independently be alkylene, wherein each alkylene is independently $C_1$ or greater, $C_2$ or greater, $C_3$ or greater, $C_4$ or greater, $C_6$ or greater, $C_8$ or greater, or $C_{10}$ or greater. Each alkylene can also be independently $C_{22}$ or smaller, $C_{16}$ or smaller, $C_{12}$ or smaller, $C_8$ or smaller, or $C_4$ or smaller.

Each $R_5$ can independently be alkyl, alkoxy, or hydroxy, with the proviso that at least one $R_5$ is alkoxy or hydroxy. When $R_5$ is alkyl, it can be $C_1$ or greater, $C_2$ or greater, $C_3$ or greater, $C_4$ or greater, $C_6$ or greater, $C_8$ or greater, or $C_{10}$ or greater. The alkyl can also be $C_{22}$ or smaller, $C_{16}$ or smaller, $C_{12}$ or smaller, $C_8$ or smaller, or $C_4$ or smaller. Most commonly the alkyl is ethyl or methyl. When $R_5$ is alkoxy, the alkyl portion of the alkoxy can be $C_1$ or greater, $C_2$ or greater, $C_3$ or greater, $C_4$ or greater, $C_6$ or greater, $C_8$ or greater, or $C_{10}$ or greater. The alkyl portion of the alkoxy can be $C_{22}$ or smaller, $C_{16}$ or smaller, $C_{12}$ or smaller, $C_8$ or smaller, or $C_4$ or smaller. Most commonly, the alkyl portion of the alkoxy is ethyl or methyl. In such cases, the alkoxy is ethoxy or methoxy.

A specific example of an $R_1$ of this type is $CH_2CH(OH)(CH_2)O(CH_2)_3Si(R_5)_3$. In this example, $R^a$ is $R^bOR^c$, $R^b$ is methylene and $R^c$ is propylene. An even more specific example is $CH_2CH(OH)(CH_2)O(CH_2)_3Si(OMe)_3$. In this example, $R^a$ is $R^bOR^c$, $R^b$ is methylene, $R^c$ is propylene, and each $R^5$ is methoxy. A compound of Formula (I) or Formula (Ia) bearing this type of $R_1$ can be formed by reaction of the secondary amine of Formula (IV) with a compound of Formula (VIIa).

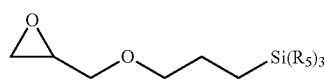

(VIIa)

$R_1$ can also be $R^d$—$R^e$. In such cases, $R^d$ is alkylene. The alkylene can be $C_1$ or greater, $C_2$ or greater, $C_3$ or greater, $C_4$ or greater, $C_6$ or greater, $C_8$ or greater, or $C_{10}$ or greater. It can also be $C_{22}$ or smaller, $C_{16}$ or smaller, $C_{12}$ or smaller, $C_8$ or smaller, or $C_4$ or smaller. Examples of $R^d$ include ethylen4, n-propylene, and n-butylene.

$R^e$ is $Si(R_5)_3$, $SO_3H$ or a salt thereof, or $CO_2H$ or a salt thereof wherein $R_5$ is defined as above. When a salt is used, it can be any suitable salt. Suitable salts include salts of alkaline metals, salts of alkaline earth metals, and ammonium salts. Common alkaline metals include sodium and potassium. Common alkaline earth metals include magnesium and calcium. Salts of ammonium and alkaline metals are most common.

A compound of Formula (I) or Formula (Ia) bearing this type of $R_1$ group wherein $R^e$ is $SO_3H$ or a salt thereof can be formed by reaction of the secondary amine of Formula (IV) with a sulfone, for example, a compound of Formula (VIII). This reaction can be carried out by stirring the amine of Formula (IV) with the compound of Formula (VIII) at ambient temperature. Moderate heating, for example, to 60° C., can be applied if necessary.

(VIII)

In the compound of Formula (VIII), $R^d$ is defined as discussed above with respect to $R_1$.

A specific example of a compound of Formula (VIII) wherein $R^d$ is propylene is the compound of Formula (VIIIa).

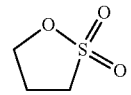

(VIIIa)

A compound of Formula (I) or Formula (Ia) bearing this type of $R_1$ group wherein $R^e$ is a $CO_2H$ or a salt thereof can be formed using lactones that correspond to the sulfones of Formulas (VIIII) or (VIIIa). Examples of such lactones are lactones of Formula (VIIIb) and (VIIIc).

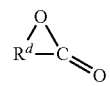

(VIIIb)

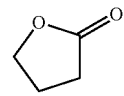

(VIIIc)

When $R^e$ is a salt of $SO_3H$ or $CO_2H$, it can be any suitable salt. Suitable salts include, but are not limited to, cations of alkali metal salts, such as lithium, sodium, and potassium, and cations of alkali earth salts, such as calcium and magnesium. Ammonium salts are also suitable. The salt can also be a mixed salt with more than one type of cation.

A compound of Formula (I) or Formula (Ia) bearing this type of $R_1$ group wherein $R^e$ is a $Si(R_5)_3$ can be formed by reaction of the secondary amine of Formula (IV) with a compound of Formula (IX).

(IX)

In the compound of Formula (IX), LG' is a leaving group. Any suitable leaving group can be used. Exemplary leaving groups include chloride, bromide, iodide, methylsulfonate, trifluoromethansulfonate, tosylate, and mesylate.

An example of a compound of Formula (IX) wherein $R^d$ is propylene and LG is chloride is the compound of Formula (IXa).

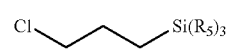

(IXa)

When $R_1$ is not H, reaction of the compound of Formula (VI) to covalently bond to $R_1$ converts a secondary amine of Formula (IV) to a tertiary amine, as shown in the compound of Formula (X).

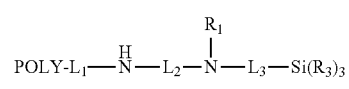

(X)

In the compound of Formula (X), POLY, $L_1$, $L_2$, $R_1$, $R_2$, and $R_3$ are defined as above with respect to Formula (I), except that $R_1$ is not H and $R_2$ is absent.

An example of a compound of Formula (X) that can be formed from the compound of Formula (Ia), that is, wherein $L_1$ is carbonyl, is the compound of Formula (Xa).

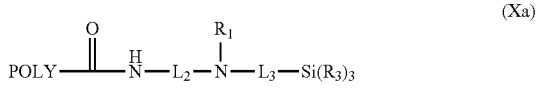

A compound of Formula (X) or Formula (Xa) can be used without further chemical modification. One example of such a compound is the compound of Formula (XI).

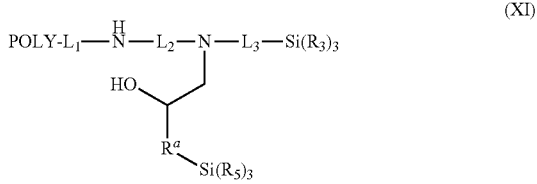

In some compounds of Formula (XI), $L_1$ is carbonyl, and $L_2$ and $L_3$ are independently alkylene. Also, $R^a$ is often $R^bOR^c$.

When $L_1$ in the compound of Formula (XI) is carbonyl, the compound of Formula (XI) is a compound of Formula (XIa).

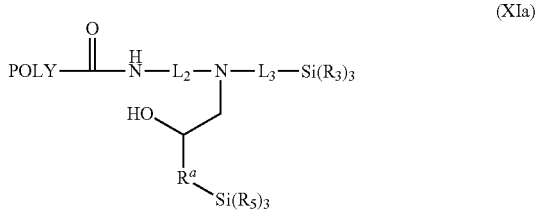

In the compound of Formula (XIa), $R^a$ can be $R^b$—O—$R^c$, in which case the compound of Formula (XIa) is the compound of Formula (XIb).

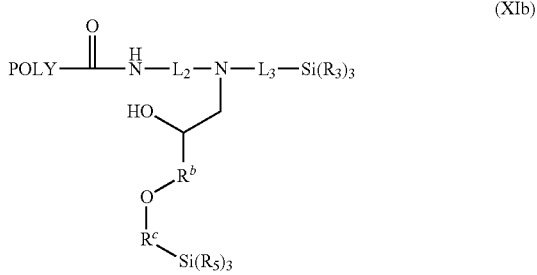

In certain cases of any of the compounds of Formulas (XI), (XIa), and (XIb), each $R_3$ can be alkoxy, such as methoxy or ethoxy. In any of the compounds of Formulas (XI), (XIa), and (XIb), each $R_5$ can be alkoxy, such as methoxy or ethoxy. In any of the compounds of Formulas (XI), (XIa), and (XIb), $L_2$ can be alkylene, such as $C_1$ to $C_4$ alkylene, for example, ethylene. In any of the compounds of Formulas (XI), (XIa), and (XIb), $L_3$ can be alkylene, such as $C_1$ to $C_4$ alkylene, for example, propylene such as n-propylene.

The tertiary amine in the compound of any of Formulas (XI), (XIa), and (XIb) can be further reacted to form a compound of Formula (I) or (Ia) wherein $R_2$ is not absent.

For example, a compound of Formula (XI) or (XIa) can be protonated by reaction with an acid, such as hydrochloric acid, sulfuric acid, nitric acid, phosphoric acid, acetic acid, and the like, to form a compound of Formula (I) or Formula (Ia) wherein $R_2$ is H.

Compounds of Formula (I) or (Ia) wherein $R_2$ is neither absent nor H can also be formed. For example, a compound of Formula (X), Formula (Xa), or any of the compounds of Formulas (XI), (XIa), and (XIb) can react with a compound of any of Formulas (VII), (VIIa), (VIII), (VIIIa), (VIIIb), (VIIIc), (IX), or (IXa) to form a covalent bond to an $R_2$ group that is derived from whichever compound of (VII), (VIIa), (VIII), (VIIIa), (VIIIb), (VIIIc), (IX), or (IXa) is used. In this case, the charge on the amine nitrogen, m, is $1^+$.

Exemplary compounds wherein $R_2$ is neither H nor absent include compounds of Formulas (XII)

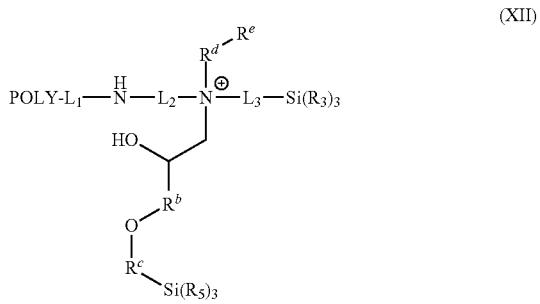

In the compound of Formula (XII), $R_1$ is $CH_2CH(OH)R^aSi(R_5)_3$ (or more specifically, $CH_2CH(OH)R_b$—O—$R_cSi(R_5)_3$) and $R_2$ is $R^d$—$R^e$. Compounds of Formula (XII) can be formed by reacting compounds of Formula (XIa) with any compound of Formulas (VII), (VIIa), (VIII), (VIIa), (VIIIb), (VIIIc), (IX), or (IXa).

In some compounds of Formula (XII), $L_1$ is carbonyl. In this case, the compound of Formula (XII) is a compound of Formula (XIIa). Compounds of Formula (XIIa) can be formed by reacting compounds of Formula (XIa) with any compound of Formulas (VII), (VIIa), (VIII), (VIIIa), (VIIIb), (VIIIc), (IX), or (IXa) using the same reaction conditions described above with respect to reactions for forming compounds of Formula (XII).

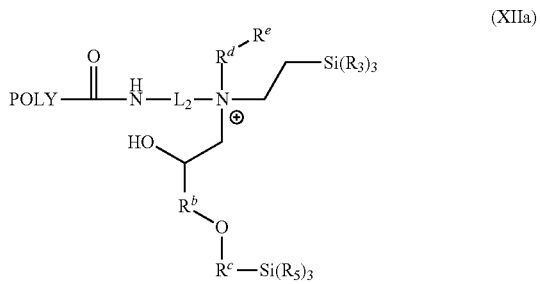

When $R^e$ in the compound of Formula (XIIa) is $Si(R_5)_3$, then the compound of Formula (XIIa) is a compound of Formula (XIIb).

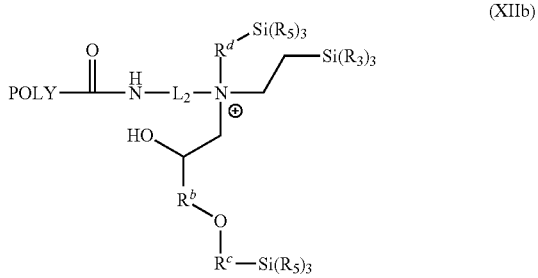

(XIIb)

When $R^e$ in the compound of Formula (XIIa) is $SO_3H$ or a salt thereof, then the compound of Formula (XIIa) is a compound of Formula (XIIc) or a salt thereof.

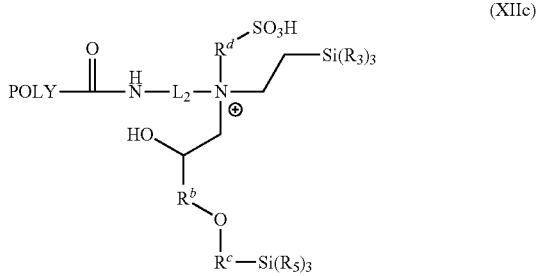

(XIIc)

Fluorinated silanes such as those described herein can have a variety of uses. For example, the compounds can be useful to form modified surfaces that repel water, as evidenced by an increased contact angle of water with the surfaces. In addition, the compounds can be ink repellent. Thus, the compounds can modify surfaces to resist soiling and weathering. The surfaces that can be modified include glass and ceramic surfaces. Such surfaces can be modified by way of a covalent bond between the fluorinated silane and the glass or ceramic surface.

One or more fluorinated silane can be present in a composition. The composition can be an aqueous solution or aqueous dispersion. An alcohol, such as one or more of methanol, ethanol, and isopropanol, can also be included. The alcohol can increase the solubility or dispersibility of the compounds. However, the alcohol is not required because the compounds typically have sufficient water solubility or dispersibility without the addition of alcohol.

The composition can additionally comprise one or more surfactants. In some cases, at least two surfactants are used. The surfactants can be ionic surfactants or non-ionic surfactants. Ionic surfactants can be anionic surfactants, cationic surfactants, or zwitterionic surfactants. Exemplary surfactants include stearate salt, sodium lauryl sulfate, ammonium lauryl sulfate, sodium lauryl sulfate, polysorbate-20, polysorbate-80, lauryl glucoside, lauryl glucoside, disodium lauryl sulfosuccinate, cocamidopropyl betaine, and alpha-olefin sulfonate. Such surfactants can be particularly useful when the composition is a cleaning composition. In use, such cleaning composition can be applied to a surface, such as a glass surface, and then wiped off. The modified fluorinated silane can remain bound to the glass surface by way of the silyl groups.

Other suitable ingredients can also be included in the composition. Examples of ingredients that can be suitable, depending on the intended use, include fragrance, colorant, cleaning agent, tonicity adjusting agent, and pH adjusting agent.

The glass article can have one or more fluorinated silanes according to this description affixed thereto. Exemplary glass articles can include slides, windows, billboards, walls, lenses, such as eyeglass lenses, prisms, mirrors, and cook tops.

Automobiles can comprise at least one glass element. A compound as described herein can be affixed to one or more of the at least one glass elements.

Listing of Exemplary Embodiments

Particular embodiments are discussed below to assist in understanding the invention, and are not to be construed as limiting. None of the particular features discussed in these embodiments is required, unless otherwise specified. The embodiments discussed below are illustrative; other embodiments are also envisioned.

Embodiment 1 is a compound of Formula (I)

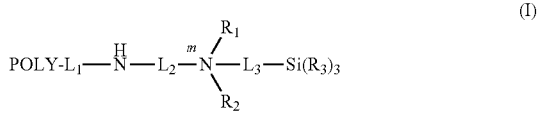

(I)

wherein:
POLY is a fluoropolymeric group;
$L_1$ is independently a covalent bond, carbonyl, alkylene carbonyl, alkenylene carbonyl, alkynylene carbonyl, alkylene, aralkylene, alkenylene, or alkynylene;
$L_2$ is alkylene, aralkylene, alkynylene, or arylene;
$L_3$ is alkylene, aralkylene, alkynylene, or arylene;
m represents the charge on the N atom, which is 0 or $1^+$; and either:
$R_1$ is H, $CH_2CH(OH)R^a$—$Si(R_5)_3$ or $R^d$—$R^e$, and
$R_2$ is absent, H, $CH_2CH(OH)R^a$—$Si(R_5)_3$ or $R^d$—$R^e$, or
$R_1$ and $R_2$ are covalently bound to one another, and are together alkylene, aralkylene, alkenylene, alkynylene, arylene, or any of the preceding substituted with hydroxy;
each $R_3$ is independently hydroxy, alkoxy, or alkyl, provided that at least one $R_3$ is either hydroxy or alkoxy;
$R^a$ is alkylene or $R^b$—O—$R^c$;
$R^b$ is alkylene,
$R^c$ is alkylene;
$R^d$ is alkylene;
$R^e$ is $Si(R_5)_3$, $SO_3H$ or a salt thereof, or $CO_2H$ or a salt thereof; and
each $R_5$ is independently alkyl, alkoxy, or hydroxy, provided that at least one $R_5$ is alkoxy or hydroxy.

Embodiment 2 is a compound of embodiment 1, wherein the fluoropolymeric group is a perfluorinated polymeric group.

Embodiment 3 is a compound of embodiment 1, wherein the fluoropolymeric group is a fluorinated polyolefinic group.

Embodiment 4 is a compound of embodiment 2, wherein the fluorinated polyolefinic group is a perfluorinated polyolefinic group.

Embodiment 5 is a compound of embodiment 1, wherein the fluoropolymeric group is a fluorinated polyalkylene group.

Embodiment 6 is a compound of embodiment 5, wherein the fluorinated polyalkylene group is a perfluorinated polyalkylene group.

Embodiment 7 is a compound of any of the preceding embodiments, wherein the fluoropolymeric group is a fluorinated polyether group.

Embodiment 8 is a compound of embodiment 7, wherein the fluorinated polyether group is a perfluorinated polyether group.

Embodiment 9 is a compound of embodiment 7 or 8, wherein the fluorinated polyether group has one or more repeat units of the formula —$R_fO$—, wherein $R_f$ is fluoroalkylene or perfluoroalkylene.

Embodiment 10 is a compound of embodiment 9, wherein $R_f$ has at least 2 carbon atoms.

Embodiment 11 is a compound of embodiment 10, wherein $R_f$ has at least 3 carbon atoms.

Embodiment 12 is a compound of embodiment 11, wherein $R_f$ has at least 4 carbon atoms.

Embodiment 13 is a compound of any of embodiments 9-12, wherein $R_f$ has up to 16 carbon atoms.

Embodiment 14 is a compound of embodiment 13, wherein $R_f$ has up to 12 carbon atoms.

Embodiment 15 is a compound of embodiment 14, wherein $R_f$ has up to 10 carbon atoms.

Embodiment 16 is a compound of embodiment 14, wherein $R_f$ has up to 8 carbon atoms.

Embodiment 17 is a compound of embodiment 16, wherein $R_f$ has up to 4 carbon atoms.

Embodiment 18 is a compound of embodiment 17, wherein $R_f$ has up to 3 carbon atoms.

Embodiment 19 is a compound of any of embodiments 1 or 7-18, wherein POLY is HFPO.

Embodiment 20 is a compound of any of embodiments 1 or 7-18, wherein POLY is HFPG.

Embodiment 21 is a compound of any of the preceding embodiments, wherein POLY has a number average degree of polymerization of 6 or greater.

Embodiment 22 is a compound of embodiment 21, wherein POLY has a number average degree of polymerization of 8 or greater.

Embodiment 23 is a compound of embodiment 22, wherein POLY has a number average degree of polymerization of 10 or greater.

Embodiment 24 is a compound of embodiment 23, wherein POLY has a number average degree of polymerization of 25 or greater.

Embodiment 25 is a compound of any of the preceding embodiments, wherein POLY has a number average degree of polymerization of 20,000 or less.

Embodiment 26 is a compound of any of the preceding embodiments, wherein $L_1$ is a covalent bond, carbonyl, or alkylene carbonyl.

Embodiment 27 is a compound of embodiment 26, wherein $L_1$ is carbonyl or alkylene carbonyl.

Embodiment 28 is a compound of embodiment 27, wherein $L_1$ is carbonyl.

Embodiment 29 is the compound of any of the preceding embodiments, wherein the compound has the structure of Formula (IV)

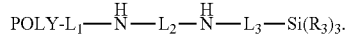

(IV)

Embodiment 30 is the compound of any of the preceding embodiments, wherein the compound has the structure of Formula (IVa)

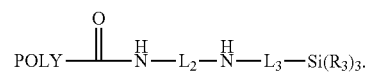

(IVa)

Embodiment 31 is a compound of any of the preceding embodiments, wherein $L_2$ is alkylene, aralkylene, or arylene.

Embodiment 32 is a compound of any of the preceding embodiments, wherein $L_2$ is alkylene.

Embodiment 33 is a compound of embodiment 32, wherein the alkylene is $C_1$ to $C_8$ alkylene.

Embodiment 34 is a compound of embodiment 33, wherein the alkylene is $C_1$ to $C_6$ alkylene.

Embodiment 35 is a compound of embodiment 34, wherein the alkylene is ethylene. Embodiment 36 is a compound of any of the preceding embodiments, wherein $L_3$ is alkylene, aralkylene, or arylene.

Embodiment 37 is a compound of embodiment 36, wherein $L_3$ is alkylene.

Embodiment 38 is a compound of embodiment 37, wherein the alkylene is $C_1$ to $C_8$ alkylene.

Embodiment 39 is a compound of embodiment 38, wherein the alkylene is $C_1$ to $C_4$ alkylene.

Embodiment 40 is a compound of embodiment 39, wherein the alkylene is propylene.

Embodiment 41 is a compound of any of the preceding embodiments, wherein each $R_3$ is alkoxy.

Embodiment 42 is a compound of embodiment 41, wherein each alkoxy is methoxy or ethoxy.

Embodiment 43 is a compound of any of the preceding embodiments, wherein $R_1$ and $R_2$ are covalently bound to one another, and are together alkylene, aralkylene, alkenylene, alkynylene, arylene, or any of the preceding substituted with hydroxy.

Embodiment 44 is a compound of embodiment 43, wherein $R_1$ and $R_2$ are together alkylene or alkylene substituted with hydroxy.

Embodiment 45 is a compound of any of the preceding embodiments, wherein the compound has a structure of Formula (VI)

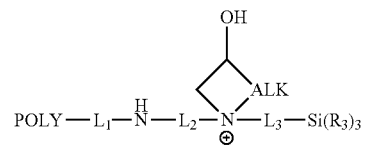

(VI)

wherein ALK is alkylene.

Embodiment 46 is a compound of embodiment 45, wherein the compound has a structure of Formula (VIa)

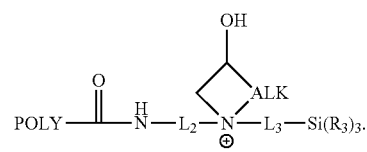

(VIa)

Embodiment 47 is a compound of any of embodiments 45-46, wherein ALK is $C_1$ to $C_8$ alkylene.

Embodiment 48 is a compound of any of embodiments 45-47, wherein ALK is $C_1$ to $C_4$ alkylene.

Embodiment 49 is a compound of any of embodiments 45-48, wherein ALK is methylene.

Embodiment 50 is a compound of any of embodiments 45-49, wherein the compound has the structure of Formula (VIb)

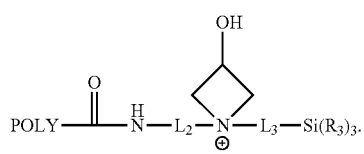

Embodiment 51 is a compound of any of embodiments 1-42, wherein $R_1$ is H, $CH_2CH(OH)R^a$—$Si(R_5)_3$, or $R^d$—$R^e$, and $R^2$ is absent, H, $CH^2CH(OH)R^a$—$Si(R_5)_3$ or $R^d$—$R^e$.

Embodiment 52 is a compound of embodiment 51, wherein $R_1$ is H.

Embodiment 53 is a compound of embodiment 51, wherein $R_1$ is $CH_2CH(OH)R^a$—$Si(R_5)_3$.

Embodiment 54 is a compound of embodiment 53, wherein $R^a$ is alkylene.

Embodiment 55 is a compound of embodiment 53, wherein $R^a$ is $R^bOR^c$.

Embodiment 56 is a compound of embodiment 55, wherein $R^b$ is alkylene and $R^c$ is alkylene.

Embodiment 57 is a compound of any of embodiments 53-56, wherein each $R_5$ is alkoxy.

Embodiment 58 is a compound of embodiment 57, wherein each alkoxy is ethoxy or methoxy.

Embodiment 59 is a compound of embodiment 51, wherein $R_1$ is $R^d$—$R^e$.

Embodiment 60 is a compound of embodiment 59, wherein $R^d$ is ethylene, propylene, or butylene.

Embodiment 61 is a compound of any of embodiments 51 or 59-60, wherein $R^e$ is $Si(R_5)_3$.

Embodiment 62 is a compound of embodiment 61 wherein each $R_5$ is alkoxy.

Embodiment 63 is a compound of embodiment 62, wherein each alkoxy is methoxy or ethoxy.

Embodiment 64 is a compound of any of embodiments 51 or 59-61, wherein $R^e$ is $SO_3H$ or a salt thereof.

Embodiment 65 is a compound of any of embodiments 51 or 59-61, wherein $R^e$ is $CO_2H$ or a salt thereof.

Embodiment 66 is a compound of any of embodiments 1-42 or 51-65, wherein $R_2$ is absent, H, $CH_2CH(OH)R^a$—$Si(R_5)_3$ or $R^d$—$R^e$.

Embodiment 67 is a compound of any of embodiments 1-42 or 51-65, wherein $R_2$ is H, $CH_2CH(OH)R^a$—$Si(R_5)_3$ or $R^d$—$R^e$.

Embodiment 68 is a compound of embodiment 66, wherein $R_2$ is H.

Embodiment 69 is a compound of embodiment 66, wherein $R_2$ is $CH_2CH(OH)R^a$—$Si(R_5)_3$.

Embodiment 70 is a compound of embodiment 69, wherein $R^a$ is alkylene.

Embodiment 71 is a compound of embodiment 69, wherein $R^a$ is $R^bOR^c$.

Embodiment 72 is a compound of embodiment 71, wherein $R^b$ is alkylene.

Embodiment 73 is a compound of any of embodiments 71-72, wherein $R^c$ is alkylene.

Embodiment 74 is a compound of any of embodiments 69-73, wherein each $R_5$ is alkoxy.

Embodiment 75 is a compound of embodiment 74, wherein each alkoxy is ethoxy or methoxy.

Embodiment 76 is a compound of embodiment 66, wherein $R_2$ is $R^d$—$R^e$.

Embodiment 77 is a compound of embodiment 76, wherein $R^d$ is ethylene, propylene, or butylene.

Embodiment 78 is a compound of any of embodiments 66 or 76-77, wherein $R^e$ is $Si(R_5)_3$.

Embodiment 79 is a compound of embodiment 78 wherein each $R_5$ is alkoxy.

Embodiment 80 is a compound of embodiment 79, wherein each alkoxy is methoxy or ethoxy.

Embodiment 81 is a compound of any of embodiments 66 or 76-77, wherein $R^e$ is $SO_3H$ or a salt thereof.

Embodiment 82 is a compound of any of embodiments 66 or 76-77, wherein $R^e$ is $CO_2H$ or a salt thereof.

Embodiment 83 is a compound of any of embodiments 1-42, wherein the compound has the structure of Formula (X)

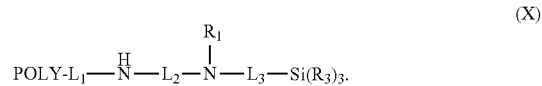

Embodiment 84 is a compound of embodiment 83, wherein the compound has the structure of Formula (Xa)

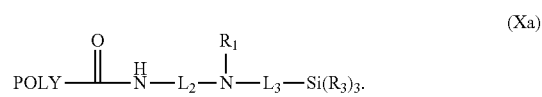

Embodiment 85 is a compound of any of embodiments 83-84, wherein the compound has the structure of Formula (XI)

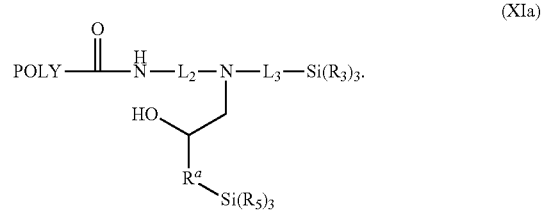

Embodiment 86 is a compound of any of embodiments 83-85, wherein the compound has the structure of Formula (XIb)

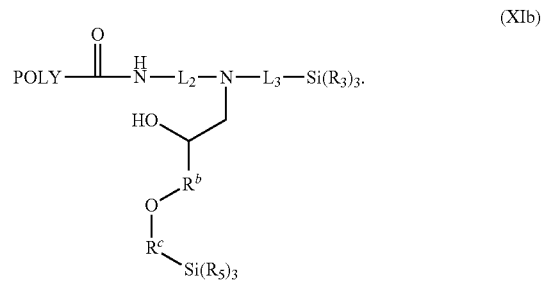

Embodiment 87 is a compound of any of embodiments 1-42, wherein the compound has the structure of Formula (XII)

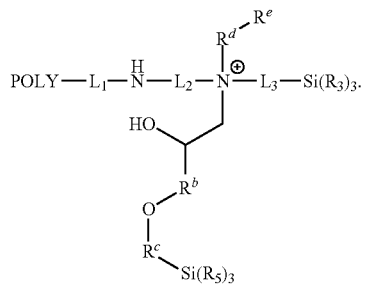

Embodiment 88 is a compound of Embodiment 87, wherein the compound has the structure of Formula (XIIa)

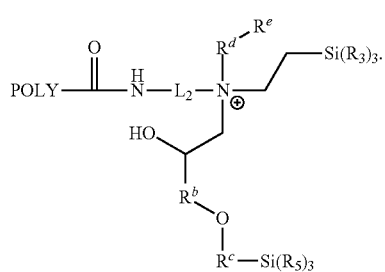

Embodiment 89 is a compound of embodiment 88, wherein the compound has the structure of Formula (XIIb)

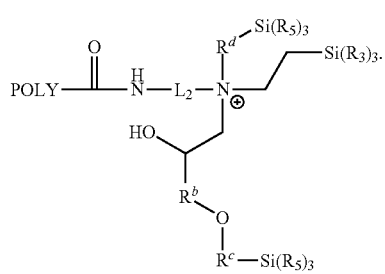

Embodiment 90 is a compound of embodiment 89, wherein the compound has the structure of Formula (XIIc)

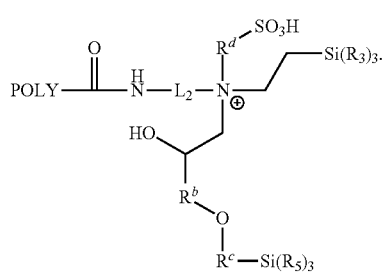

Embodiment 91 is a composition comprising an aqueous solution of a compound of any of the preceding embodiments.

Embodiment 92 is a composition comprising an aqueous dispersion of a compound of any of embodiments 1-90.

Embodiment 93 is a composition of any of embodiments 91-92, further comprising an alcohol.

Embodiment 94 is the composition of embodiment 93, wherein the alcohol is selected from methanol, ethanol, and isopropanol.

Embodiment 95 is a composition of any of embodiments 91-94, further comprising one or more surfactants.

Embodiment 96 is a composition of embodiment 95, wherein the one or more surfactants include at least one of a stearate salt, sodium lauryl sulfate, ammonium lauryl sulfate, sodium lauryl sulfate, polysorbate-20, polysorbate-80, lauryl glucoside, lauryl glucoside, disodium lauryl sulfosuccinate, cocamidopropyl betaine, and alpha-olefin sulfonate.

Embodiment 97 is a composition of any of embodiments 95-96, wherein the one or more surfactants comprise at least two surfactants.

Embodiment 98 is the composition of any of embodiments 91-97, further comprising one or more of fragrance, colorant, cleaning agent, tonicity adjusting agent, and pH adjusting agent.

Embodiment 99 is an article comprising a substrate and having a compound of any of embodiments 1-90 affixed to the substrate.

Embodiment 100 is an article of embodiment 99, wherein the substrate comprises glass.

Embodiment 101 is an article of embodiment 100, wherein the glass is a slide, a window, a billboard, a wall, a lens, a prism, a mirror, or a cooktop.

Embodiment 102 is an automobile comprising at least one glass element, wherein a compound of any of embodiments 1-90 is affixed to one or more of the at least one glass element.

EXAMPLES

Materials List
  N-[3-(trimethoxysilyl)propyl]ethylenediamine, 96%: Alfa Aesar (Ward Hill, Mass. USA)
  Glycidol TMOS: synthesized
  Diethyl oxalate, 99%: Alfa Aesar (Ward Hill, Mass., USA)
  Zn(CF3SO3)2, 98%: Alfa Aesar (Ward Hill, Mass., USA)
  1,3-propane sulfone, 99%: Alfa Aesar (Ward Hill, Mass., USA)
  Epichlorohydrin, 99%: Alfa Aesar ((Ward Hill, Mass., USA)
  (3-chloropropyl)triethoxysilane: TCI (Portland, Oreg., USA)
  HFPO methyl ester: synthesized
  Ethyl octadecanedioate
  Sodium methoxide (25 wt % in methanol): Sigma-Aldrich (Saint Louis, Mo., USA)
  Methanesulfonyl chloride, 98%: Alfa Aesar (Ward Hill, Mass., USA)

Example 1

HFPO methyl ester (201.92 g, number average molecular weight 1262 g/mol) was mixed with N-[3-(trimethoxysilyl)propyl]ethylenediamine (38 g) and stirred overnight in methanol at ambient temperature. Evaporation of methanol gave the product of Reaction Scheme 3.

Reaction Scheme 3

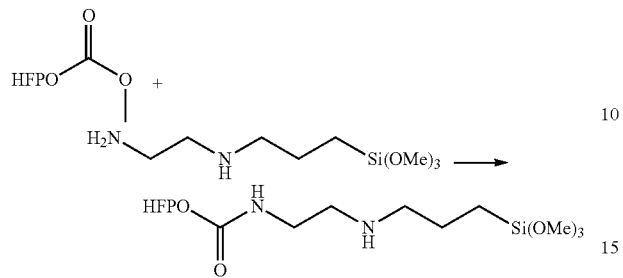

Example 2

The product of Example 1 (29.70 g) was mixed with glycidyl trimethoxysilane (4.9 g), and $Zn(CF_3SO_3)_2$ (0.02 g) in a vial and stirred at ambient temperature for 48 hours, providing the compound of Formula (XIII) as the product of Reaction Scheme 4.

Reaction Scheme 4

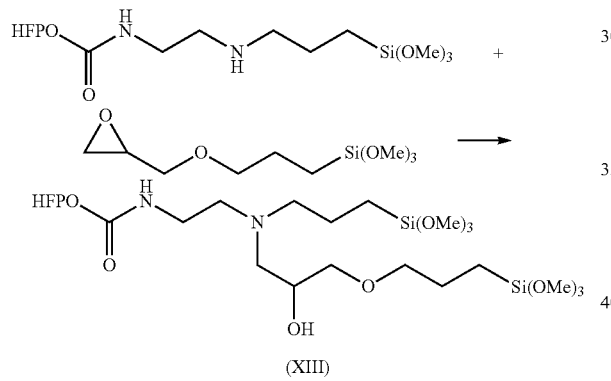

Example 3

The compound of Formula (XIII) (33.78 g) and 1,3 propane sulfone (2.49 g) were mixed in a vial and stirred at 60° C. for 48 hours, providing the compound of Formula (XIV) as the product of Reaction Scheme 5.

Reaction Scheme 5

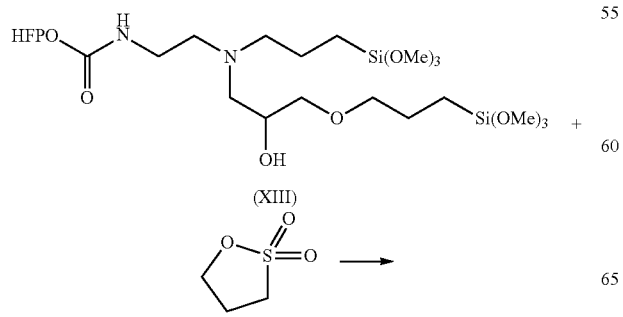

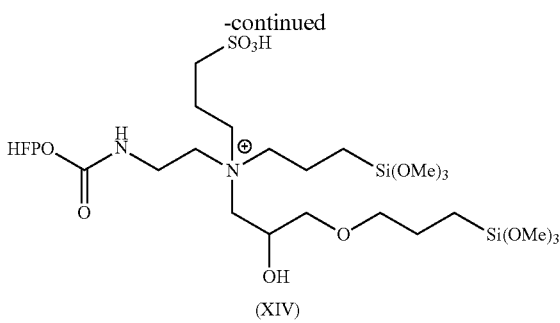

(XIV)

Example 4

The compound of Formula (XIII) (33.38 g) was mixed with (3-chororpropyl)triethoxyxilane (4.92 g) in a vial and stirred at 60° C. for 48 hours, providing the compound of Formula (XV) as the product of Reaction Scheme 6.

Reaction Scheme 6

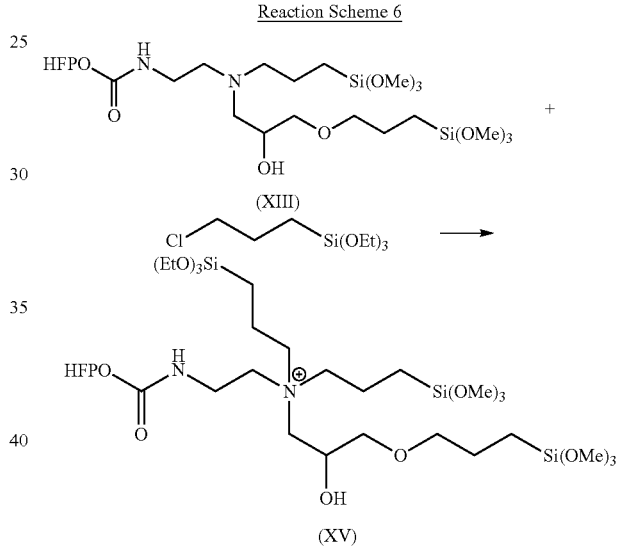

Example 5

HFPO methyl ester (201.92 g, number average molecular weight 1262 g/mol) was mixed with N-[3-(trimethoxysilyl)propyl]ethylenediamine (38 g) and stirred overnight in methanol at ambient temperature. Epichlorohydrin (31.44 g) was added, and the reaction was stirred for an additional two days at ambient temperature. Evaporation of methanol and excess epichlorohydrin gave the compound of Formula (XVI) as the product of Reaction Scheme 7.

Reaction Scheme 7

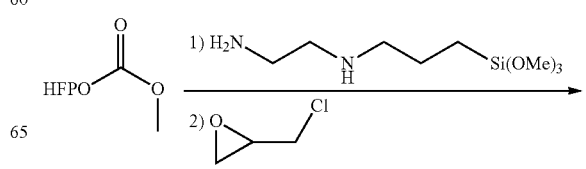

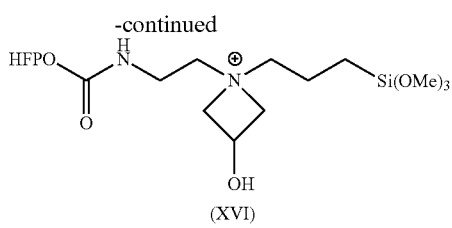

(XVI)

Comparative Example 1

Ethyl heptadecanoate (26.8 g), N-[3-(trimethoxysilyl)propyl]ethylenediamine (19 g), and sodium methoxide (0.86 g, 25% in methanol) were stirred in toluene (45 g) at 50° C. for 15 hours. The reaction mixture was cooled to room temperature. Epichlorohydrin (3.93 g) was added and stirred for two days. Evaporation of solvent provided the compound of Formula (XVII).

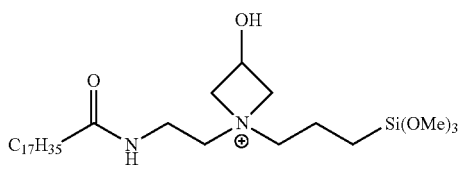

(XVII)

Examples 6-10 and Comparative Example 2

Solutions were formed of 0.1 g of one of the compounds of Formula (XIII), (XIV), (XV), (XVI), or (XVII) 0.5 g of isopropyl alcohol, 9.3 g of reverse osmosis water. Acetic acid or hydrochloric acid was added until the specified pH was reached. Each solution was wiped onto a clean glass microscope slide with a clean polyester cloth to coat the slide. The coated slides were cured either by allowing the slide to sit at ambient temperature until completely dry (RT curing), or heating to 120° C. for 15 minutes (heat curing). The contact angles, $\theta_A$ and $\theta_R$, of water and hexadecane were measured. Ink repellency was tested by drawing a line with a felt tipped marker and observing any discontinuity of the line. The results are summarized in Table 1.

The results shown in Table 1 demonstrate that the compounds disclosed herein provide a water and ink repellant coating. By comparison, a similar compound having a long chain alkane instead of a fluoropolymer moiety (Compound XXI, Comparative Examples 1 and 2) does not provide any of these advantages.

What is claimed is:

1. A compound of Formula (I)

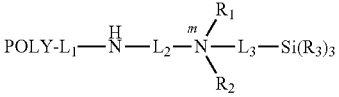

(I)

wherein:
POLY is a fluoropolymeric group;
$L_1$ is independently a covalent bond, carbonyl, alkylene carbonyl, alkenylene carbonyl, alkynylene carbonyl, alkylene, aralkylene, alkenylene, or alkynylene;
$L_2$ is alkylene, aralkylene, alkynylene, or arylene;
$L_3$ is alkylene, aralkylene, alkynylene, or arylene;
m represents the charge on the N atom, which is $1^+$;
and either:
$R_1$ is H, $CH_2CH(OH)R^a$—$Si(R_5)_3$ or $R^d$—$R^e$, and $R_2$ is $CH_2CH(OH)R^a$—$Si(R_5)_3$ or $R^d$—$R^e$, or
$R_1$ and $R_2$ are covalently bound to one another, and are together alkylene, aralkylene, alkenylene, alkynylene, arylene, or any of the preceding substituted with hydroxy;
each $R_3$ is independently hydroxy, alkoxy, or alkyl, provided that at least one $R_3$ is either hydroxy or alkoxy;
$R^a$ is alkylene or $R^b$—O—$R^c$,
$R^b$ is alkylene,
$R^c$ is alkylene;
$R^d$ is alkylene;
$R^e$ is $Si(R_5)_3$, $SO_3H$ or a salt thereof, or $CO_2H$ or a salt thereof; and
each $R_5$ is independently alkyl, alkoxy, or hydroxy, provided that at least one $R_5$ is alkoxy or hydroxy.

2. A compound of claim 1, wherein POLY is a perfluorinated polymeric group.

TABLE 1

| | | | | | Water | | Hexadecane | | |
|---|---|---|---|---|---|---|---|---|---|
| Example | Compound | Acid | pH | Curing | $\theta_A$ | $\theta_R$ | $\theta_A$ | $\theta_R$ | Ink Repellancy |
| 6 | (XIII) | Acetic Acid | 4.5 | RT | 118 | 76 | 78 | 47 | Discontinued line and dots |
| | | | | Heat | 100 | 65 | 69 | 43 | Discontinued line and dots |
| 7 | (XIII) | HCl | 2 | RT | 115 | 85 | 76 | 57 | Discontinued dots |
| | | | | Heat | 107 | 75 | 69 | 43 | Discontinued dots |
| 8 | (XIV) | HCl | 2 | RT | 111 | 84 | 70 | 51 | Discontinued dots |
| | | | | Heat | 100 | 67 | 56 | 38 | Discontinued dots |
| 9 | (XV) | HCl | 2 | RT | 114 | 86 | 68 | 48 | Discontinued dots |
| | | | | Heat | 106 | 81 | 67 | 43 | Discontinued dots |
| 10 | (XVI) | HCl | 2 | RT | 114 | 75 | 74 | 49 | Discontinued dots |
| | | | | Heat | 111 | 73 | 72 | 48 | Discontinued dots |
| CE 2 | (XXI) | HCl | 2 | RT | 76 | 34 | 16 | 11 | Solid line with small patches |
| | | | | Heat | 89 | 47 | 19 | 10 | Solid line with small patches |

3. A compound of claim 1, wherein POLY is a fluorinated polyalkylene group.

4. A compound of claim 1, wherein POLY is a fluorinated polyether group having one or more repeat units of the formula —$R_fO$—, wherein each $R_f$ is independently fluoroalkylene or perfluoroalkylene.

5. A compound of claim 1, wherein POLY is HFPO.

6. A compound of claim 1, wherein POLY is HFPG.

7. A compound of claim 1, wherein POLY has a number average degree of polymerization of 6 or greater.

8. A compound of claim 1, wherein $L_1$ is carbonyl.

9. A compound of claim 1, wherein $L_2$ is alkylene.

10. A compound of claim 1, wherein $L_3$ is alkylene.

11. A compound of claim 1, wherein the compound has a structure of Formula (VI)

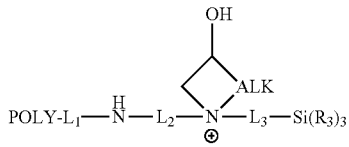

(VI)

wherein ALK is alkylene.

12. A compound of claim 1, wherein $R_1$ is $CH_2CH(OH)R^a$—$Si(R_5)_3$ or $R^d$—$R^e$, and $R^2$ is $CH^2CH(OH)R^a$—$Si(R_5)_3$ or $R^d$—$R^e$.

13. A compound of claim 1, wherein the compound has the structure of Formula (XIIa)

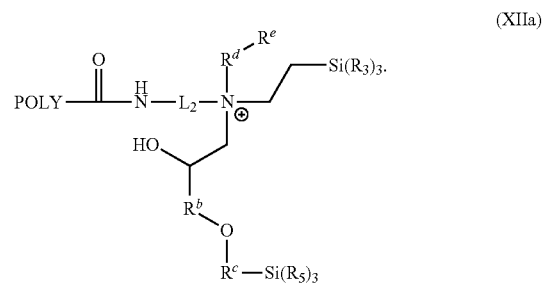

(XIIa)

14. A composition comprising an aqueous solution or dispersion of a compound of claim 1.

15. An article having a substrate and a compound of claim 1 affixed to the substrate.

* * * * *

UNITED STATES PATENT AND TRADEMARK OFFICE
CERTIFICATE OF CORRECTION

PATENT NO. : 10,233,285 B2
APPLICATION NO. : 15/528867
DATED : March 19, 2019
INVENTOR(S) : Yu Yang et al.

It is certified that error appears in the above-identified patent and that said Letters Patent is hereby corrected as shown below:

In the Specification

Column 3,
Line 22, delete "diaradicals" and insert -- diradicals --, therefor.

Column 4,
Line 4, delete "toluenylene," and insert -- toluylene, --, therefor.

Column 5,
Line 20, delete ""HFPPG"" and insert -- "HFPG" --, therefor.
Line 23, delete ""HFPPG"" and insert -- "HFPG" --, therefor.
Line 26, delete ""polytetrafluoroetylene,"" and insert -- "polytetrafluoroethylene," --, therefor.

Column 6,
Line 27, delete "polylkylene" and insert -- polyalkylene --, therefor.
Line 43, delete "fluoralkylene" and insert -- fluoroalkylene --, therefor.

Column 7,
Line 18, delete "endgroup" and insert -- end group --, therefor.

Column 9,
Line 5, delete "alkynlene" and insert -- alkynylene --, therefor.
Line 22, delete "alkyenylene," and insert -- alkenylene, --, therefor.
Line 28, delete "napthylene," and insert -- naphthylene, --, therefor.
Line 40, delete "alkyenylene," and insert -- alkenylene, --, therefor.
Line 64, delete "propy]" and insert -- propyl] --, therefor.

Column 10,
Line 67, delete "alkyenylene," and insert -- alkenylene, --, therefor.

Signed and Sealed this
Tenth Day of September, 2019

Andrei Iancu
*Director of the United States Patent and Trademark Office*

CERTIFICATE OF CORRECTION (continued)
U.S. Pat. No. 10,233,285 B2

Column 11,
Line 26, delete "trifluoromethansulfonate," and insert -- trifluoromethanesulfonate, --, therefor.
Line 59, delete "epichlorohydrine," and insert -- epichlorohydrin, --, therefor.

Column 12,
Line 1, delete "trifluoromethansulfonate," and insert -- trifluoromethanesulfonate, --, therefor.
Line 43, delete "1|." and insert -- $1^+$. --, therefor.

Column 13,
Line 37, delete "ethylen4," and insert -- ethylene, --, therefor.

Column 14,
Line 41, delete "trifluoromethansulfonate," and insert -- trifluoromethanesulfonate, --, therefor.

Column 15,
Line 56, delete "(XIb," and insert -- (XIb), --, therefor.

Column 16,
Line 18, delete "(XII)" and insert -- (XII). --, therefor.
Line 40, delete "(VIIa)," and insert -- (VIIIa), --, therefor.

Column 24,
Line 45, delete "Mass." and insert -- Mass., --, therefor.
Line 49, delete "Zn(CF3SO$_3$)$_2$," and insert -- Zn(CF$_3$SO$_3$)$_2$, --, therefor.

Column 26,
Line 19, delete "(3-chorrpropyl)triethoxyxilane" and insert -- (3-chloropropyl)triethoxysilane --, therefor.

Column 27,
Line 49, Table 1, delete "Repellancy" and insert -- Repellency --, therefor.